(12) United States Patent  
Yang

(10) Patent No.: US 11,339,456 B2
(45) Date of Patent: May 24, 2022

(54) SEPARATING AND MELTING SYSTEM AND METHOD FOR WASTE LEAD GRID IN WASTE LEAD ACID STORAGE BATTERY RECYCLING

(71) Applicant: JIANGSU NEW CHUNXING RESOURCE RECYCLING CO. LTD, Pizhou (CN)

(72) Inventor: Chunming Yang, Pizhou (CN)

(73) Assignee: JIANGSU NEW CHUNXING RESOURCE RECYCLING CO. LTD, Pizhou (CN)

( * ) Notice: Subject to any disclaimer, the term of this patent is extended or adjusted under 35 U.S.C. 154(b) by 0 days.

(21) Appl. No.: 17/050,841

(22) PCT Filed: Apr. 10, 2019

(86) PCT No.: PCT/CN2019/082106
§ 371 (c)(1),
(2) Date: Oct. 27, 2020

(87) PCT Pub. No.: WO2019/205941
PCT Pub. Date: Oct. 31, 2019

(65) Prior Publication Data
US 2021/0230713 A1  Jul. 29, 2021

(30) Foreign Application Priority Data
Apr. 28, 2018 (CN) .......................... 201810396665.7

(51) Int. Cl.
*C22B 13/02* (2006.01)
*H01M 10/54* (2006.01)
*C22B 7/00* (2006.01)

(52) U.S. Cl.
CPC ............ *C22B 13/025* (2013.01); *C22B 7/001* (2013.01); *H01M 10/54* (2013.01)

(58) Field of Classification Search
CPC ......... C22B 13/025; C22B 7/001; C22B 7/04; C22B 7/005; C22B 13/02; H01M 10/54;
(Continued)

(56) References Cited

U.S. PATENT DOCUMENTS 3,734,718 A * 5/1973 Bradshaw ............... C22B 26/22
75/409
2020/0266501 A1* 8/2020 Yang ................... B02C 17/1865

FOREIGN PATENT DOCUMENTS

CN         2835238 Y  * 11/2006  ............... C04B 2/08
CN      101414698 A  *  4/2009
(Continued)

OTHER PUBLICATIONS

Ministry of Ecology and Environment of the People's Republic of China, Technical specification of pollution control for treatment of waste lead-acid battery, 2020, pp. 1-11.
(Continued)

*Primary Examiner* — Scott R Kastler
(74) *Attorney, Agent, or Firm* — Bayramoglu Law Offices LLC

(57) ABSTRACT

A separating and melting system and method for a waste lead grid in waste lead acid storage battery recycling is provided. A drying drum is mounted on an upper end of a smelting apparatus, a dust remover is connected to an upper end of the drying drum by a flue gas duct, a lead grid turnover box is connected to the upper end of the drying drum, and a lead-containing liquid agitator passes through the drying drum into the smelting apparatus; a spiral feeder is mounted on the smelting apparatus and located in the drying drum, one end of a lead grid barrier plate is placed on the spiral feeder, and the other end of the lead grid barrier
(Continued)

plate is placed on an inner wall of the drying drum; an automatic ash acquiring machine is mounted on the smelting apparatus.

7 Claims, 4 Drawing Sheets

(58) Field of Classification Search
CPC ......... Y02W 30/84; Y02P 10/20; F27B 14/00; F27B 14/002; F27B 14/004
See application file for complete search history.

(56) References Cited

FOREIGN PATENT DOCUMENTS

| | | | | |
|---|---|---|---|---|
| CN | 201324831 | Y | | 10/2009 |
| CN | 101979165 | A | * | 2/2011 |
| CN | 104087756 | A | | 10/2014 |
| CN | 205508980 | U | | 8/2016 |
| CN | 106000557 | A | * | 10/2016 ........... B02C 17/007 |
| CN | 106252743 | A | | 12/2016 |
| CN | 206015041 | U | * | 3/2017 |
| CN | 107309158 | A | * | 11/2017 |
| CN | 108330292 | A | | 7/2018 |
| CN | 108342581 | A | | 7/2018 |
| CN | 108620229 | A | | 10/2018 |
| CN | 208121171 | U | | 11/2018 |
| CN | 208121173 | U | | 11/2018 |
| JP | 2008226768 | A | | 9/2008 |
| RU | 98192 | U1 | * | 10/2010 |

OTHER PUBLICATIONS

Ministry of Ecology and Environment of the People's Republic of China, Clean Production Standards for Waste Lead-acid Storage Battery Lead Recycling Industry, 2009, pp. 1-7.
National Development and Reform Commission, Access Conditions for Lead and Zinc Industry, 2007, pp. 1-4.

* cited by examiner

SEPARATING AND MELTING SYSTEM AND METHOD FOR WASTE LEAD GRID IN WASTE LEAD ACID STORAGE BATTERY RECYCLING

CROSS REFERENCE TO THE RELATED APPLICATIONS

This application is the national stage entry of International Application No. PCT/CN2019/082106, filed on Apr. 10, 2019, which is based upon and claims priority to Chinese Patent Application No. 201810396665.7, filed on Apr. 28, 2018, the entire contents of which are incorporated herein by reference.

TECHNICAL FIELD

The present invention relates to the field of comprehensive recycling of a waste lead acid storage battery, and specifically to a separating and melting system and method for a waste lead grid in waste lead acid storage battery recycling.

BACKGROUND

Lead acid storage battery is one with the largest production and the widest use among all types of batteries in the world. It accounts for 85% or more of the world's total lead consumption. China's lead acid storage battery industry entered a period of vigorous development since the 1990s. With the development of the national economy, its market will continue to expand, mainly covering the fields of automobiles, motorcycles, electric vehicles, electric power, and communication. In recent years, the development of emission-free vehicles such as electric vehicles has led to greater development in the lead acid storage battery industry. However, as more lead acid storage batteries are being produced, there will be more lead acid storage batteries that need to be scrapped and replaced. From this point of view, the lead acid storage battery is the most harmful to the environment and the health of human body. In the production and recycling of secondary lead, raw materials are available from many sources. Among others, 90% or more are from waste lead acid storage batteries. According to statistics, the amount of waste lead acid storage batteries produced in 2017 will reach four million tons.

A water lead acid storage battery mainly includes the following components: 1. waste electrolyte; 2. electrodes (positive electrode and negative electrode), where the positive electrode and negative electrode of the battery are grids made of a lead alloy, a surface of the positive electrode is coated with metal lead powder, and a surface of the negative electrode is coated with lead oxide powder; 3. storage battery case, which is mainly a housing made of a plastic such as PP or ABS; and 4. separator, which is mainly microporous rubber, PVC plastic separator, or paper sheet.

Regarding the disposal of waste lead acid storage batteries, China has promulgated regulations such as "Access Conditions for Lead and Zinc Industry", "Clean Production Standards for Waste Lead-acid Storage Battery Lead Recycling Industry", and "Technical Specifications for Pollution Control of Waste Lead-acid Storage Battery Treatment", strictly requiring the enterprises to carry out pretreatment including crushing and sorting of waste lead acid storage batteries. The waste lead acid storage battery is crushed by an automatic crushing and sorting system into the following four components: waste lead grid, lead mud, waste plastic, and separator paper, among which the waste lead grid accounts for about 25%. Such lead grid is mostly lead-based alloy, containing valuable elements such as antimony and tin, which can be melted directly at low temperature to produce the lead-based alloy. There is often a small amount of lead oxides or other impurities, which have a moisture content of up to 10% or more, attached to the surface of the waste lead grid. Therefore, the lead grid cannot be directly put into the smelting pot for melting, otherwise an explosion is likely to occur during the feeding process, affecting the safety of production. In addition, when excessive water remains in the smelting process, the vaporization of water will take away a lot of heat, which also increases smelting costs.

Because there is often a small amount of lead oxides or other impurities attached to the surface of the waste lead grid, floating slag such as lead oxide slag is formed on the surface of the molten lead-containing liquid in the production process, so it is necessary to manually remove the lead oxide slag floating on the surface of the lead-containing liquid. At present, workers use a shovel with leakage holes to collect the floating slag from the smelting pot, and put the collected lead oxide slag into an ash hopper. The manual operation method requires workers to work in a high-temperature environment, and the collection of the lead oxide slag is labor consuming and inefficient, with low safety. In addition, dust is easily raised during the collection of the lead oxide slag, and the lead oxide slag cannot be completely removed. Also, because the lead-containing liquid is likely to produce lead vapor, workers collecting the lead oxide slag are prone to lead poisoning once inhaling this toxic gas into their bodies, which seriously damages the health of workers.

Moreover, the copper-made terminals on the poles are mixed with the lead grids and are difficult to separate. During the smelting of the lead grids at low temperature, once the copper-made terminals enter the lead slag due to the high melting point and light specific gravity, it is extremely unrealistic to manually find the copper-made terminals from such a huge pile of waste lead acid storage batteries. If the copper-made terminals are mixed into the crude lead in the next smelting process, not only a lot of copper resources are wasted, but also extremely high production costs of lead refining and copper removal are rendered.

SUMMARY

An objective of the present invention is to provide a separating and melting system and method for a waste lead grid in waste lead acid storage battery recycling with a high degree of automation and a high heat utilization.

The technical solution of the present invention is implemented as follows. The present invention includes a separating and melting system and method for a waste lead grid.

The separating and melting system for the waste lead grid includes a dust remover, a flue gas duct, a lead-containing liquid agitator, a lead grid turnover box, a lead grid barrier plate, an ash discharging tube, an automatic ash acquiring machine, a lead ash transporter, a copper-made terminal separator, a lead mud tank, a lead mud agitator, a copper piece collection box, a circulating water treatment apparatus, a smelting apparatus, a spiral feeder, and a drying drum.

The drying drum is mounted on an upper end of the smelting apparatus. The dust remover is connected to an upper end of the drying drum by means of the flue gas duct. The lead grid turnover box is connected to the upper end of the drying drum. The lead-containing liquid agitator extends through the drying drum into the smelting apparatus. The spiral feeder is mounted on the smelting apparatus and located in the drying drum. One end of the lead grid barrier plate is placed on the spiral feeder, and the other end of the lead grid barrier plate is placed on an inner wall of the drying drum. The automatic ash acquiring machine is mounted on the smelting apparatus, a feed end of the automatic ash acquiring machine is located in the smelting apparatus, and a discharge port of the automatic ash acquiring machine is connected to a feed inlet of the lead ash transporter by means of the ash discharging tube. A discharge port of the lead ash transporter is located at the copper-made terminal separator. The copper-made terminal separator is mounted on the lead mud tank. A circulating water flushing pipe on the copper-made terminal separator is connected to a clean water outlet end of the circulating water treatment apparatus by means of a conduit, and a waste water inlet end of the circulating water treatment apparatus is connected to a lower portion of the lead mud tank. The lead mud agitator is further connected to the lead mud tank.

The smelting apparatus includes a pot cover, a smelting furnace, a smelting pot, a siphon lead release pipe, and a lead release valve. The smelting pot is placed on the smelting furnace. The pot cover is provided on a top of the smelting pot. The siphon lead release pipe is provided at a bottom of the smelting pot. The siphon lead release pipe outputs a lead-containing liquid by means of the lead release valve. The drying drum, the spiral feeder, and the automatic ash acquiring machine are placed on the pot cover.

The automatic ash acquiring machine includes a motor, a reducer, a coupling, a cylinder, a main shaft, a spiral blade, an ash inlet, an ash outlet, an ash collecting plate, leakage holes, a bottom bearing seat and a bracket traveling wheel. A front end of the cylinder is provided with the ash outlet, and a rear end of the cylinder is provided with the ash inlet. The main shaft is mounted in the cylinder. The spiral blade is mounted on the main shaft. The main shaft runs through the cylinder. A rear end of the main shaft is connected to the bottom bearing seat, and a front end of the main shaft is connected to the coupling. The coupling is connected to the motor by the reducer. The ash collecting plate is connected to the cylinder at a position of the ash inlet.

The leakage holes having a diameter of ϕ3-6 mm are evenly distributed on the ash collecting plate, allowing the lead-containing liquid to flow back into the lead smelting pot, so that the lead-containing liquid is fully separated from a lead ash.

The bracket traveling wheel is connected to a bottom surface of the cylinder. The bracket traveling wheel is located on a wall of the cylinder between the ash outlet and the ash inlet. Wheels are disposed on bracket feet of the bracket traveling wheel, to facilitate movement of the entire ash acquiring machine on ground.

The spiral feeder is located at a lower end of the lead grid barrier plate and has two ends arranged outside the drying drum. The spiral feeder is provided with a feeding port at an upper portion thereof and a discharging port at a lower portion thereof.

The lead grid barrier plate is an elliptical 10-20 mm thick high-temperature resistant steel plate, with all sides thereof connected to the inner wall of the drying drum. The lower end of the lead grid barrier plate is connected to the spiral feeder, forming an angle of 30-60° with a surface of the smelting pot. Vent holes having a diameter of ϕ2-6 mm are evenly distributed on the lead grid barrier plate, to facilitate transfer of flue gas waste heat to preheat the waste lead grid.

The copper-made terminal separator includes an outer cylinder, a rotary screen, a drive pulley, an ash inlet, a lead ash transporter, a supporting roller, a supporting roller bracket, the circulating water flushing pipe, a material deflector, a discharge port supporting roller track, a copper piece screen, a lead ash slurry outlet, a copper piece discharge port, a feeding port supporting roller track, and a motor. Two ends of the rotary screen are each connected to a supporting roller track, i.e., are respectively connected to the discharge port supporting roller track and the feeding port supporting roller track. The supporting roller track is a hollow ring in communication with an inside of the rotary screen. A corresponding supporting roller is provided on the supporting roller track. The supporting roller is mounted on the supporting roller bracket. One end of the discharge port supporting roller track is connected to the copper piece screen. An end portion of the copper piece screen is a copper piece discharging port. The drive pulley is connected to one side of the feeding port supporting roller track. The drive pulley is connected to the motor by a belt. The lead ash transporter runs through the ring of the feeding port supporting roller track and enters the rotary screen. The ash inlet is provided at the other end of the lead ash transporter. The material deflector is provided at an inner wall of the rotary screen. The outer cylinder is provided outside the rotary screen. The lead ash slurry outlet is provided at a bottom of the outer cylinder. The circulating water flushing pipe is connected to the outer cylinder. The circulating water flushing pipe sprays circulating water to the rotating rotary screen.

The circulating water treatment apparatus includes a clean water output pipe, a filter pressing water return pipe, a clean water pump, a lead mud pump, a circulating water pool, a filter press, and a lead slurry input pipe. A water inlet end of the clean water pump is connected to the circulating water pool. A water outlet end of the clean water pump is connected to a circulating water inlet pipe. The filter press is provided above the circulating water pool. An output end of the filter press is connected to the circulating water pool by the filter pressing water return pipe. An input end of the filter press is connected to an output end of the lead mud pump by a conduit, and an input end of the lead mud pump is connected to the lower portion of the lead mud tank.

The separating and melting method includes the following steps:

Step (1) crushing and sorting a waste lead acid storage battery, and placing the sorted lead grid into the turnover box for later use;

Step (2) drying and preheating the waste lead grid by using a high-temperature flue gas of a smelting pot, controlling a moisture content of the waste lead grid to be 2% or below, and placing the waste lead grid into the smelting pot for low-temperature melting;

Step (3) using the automatic ash acquiring machine for ash acquiring to separate the melted lead-containing liquid from a floating slag, and transporting the lead floating slag to the copper-made terminal separator;

Step (4) turning on the separator, spraying high-pressure circulating water to the lead floating slag containing a copper-made terminal to wash away oxidized lead ash attached to the copper-made terminal, further moving the copper-made terminal forward under action of a material deflector, and discharging the copper-made terminal from a copper piece discharging port of a copper piece screen to complete separation of the copper-made terminal from the lead ash; and Step (5) causing the purified lead-containing liquid to flow into a heat preservation lead package through a lead release pipe and a lead release valve, for preparing an alloy in a next process.

Beneficial effects: By means of the above solution, the waste lead acid storage battery is crushed and the sorted waste lead grid is placed in the turnover box. The lead grid generally has a moisture content of greater than 10% and is not suitable for being directly introduced into the smelting pot. The movable bottom plate at the bottom of the turnover box is opened. The wet waste lead grid falls onto the lead grid barrier plate. The high-temperature flue gas from the lead smelting pot preheats and dries the lead grid. Under the action of gravity, the dried lead grid slides down the slope to the feeding port of the spiral feeder at the bottom of the barrier plate. The spiral feeder is turned on to transport the lead grid to the lead smelting pot. The feeding speed can be controlled depending on the feeding situation to ensure uniform feeding and avoid blocking The waste lead grid is dried by waste heat and then enters the smelting pot to be melted at low temperature. The temperature is controlled at 350-450° C. Lead oxide and other impurities attached to the lead grid and copper-made terminals mixed therein float on the surface of the lead liquid due to their light specific gravity. After the level of the lead-containing liquid reaches a certain height, the agitator of the smelting pot is turned on and an appropriate amount of slag remover is added to further separate the lead in the slag from the slag. When the lead oxide slag in the lead smelting pot needs to be acquired, the ash inlet of the automatic ash acquiring machine 7 is placed at an agitating shaft of an agitator in the pot. The angle between the ash acquiring machine and the ash level of the pot is generally less than 45°. The ash acquiring machine and the agitator are turned on. The slag will enter the ash acquiring machine through the ash inlet by means of the ash collecting plate under the action of the rotation of the agitating shaft, and the spiral blade slowly transports the slag along the cylinder through the ash discharging tube to the lead ash conveyor to enter the copper-made terminal separator. The separator is turned on. Under the action of the material deflector, the lead slag containing a copper-made terminal slowly moves toward the front end of the rotary screen. The lead oxide slag is flushed with high-pressure water sprayed from the circulating water flushing pipe to wash away the lead oxide slag attached to the copper-made terminal. Under the action of the material deflector, the copper-made terminal on the rotary screen further moves forward, is washed clean by circulating water, flows to the copper piece screen to be discharged from the copper piece discharging port of the copper piece screen, and then enters a copper piece collection box, thus completing the separation of the copper-made terminal from the lead ash. The ash slurry formed after washing flows through the rotary screen and enters the lead mud tank via the lead ash slurry outlet, and is then agitated by the agitator to form a lead mud suspension, which is pumped into the filter press by the lead mud pump. The lead mud is dehydrated into a filter cake with a moisture content of less than 10%. The filter pressing water flows into the circulating water pool for recycling.

The lead-containing liquid in the lead smelting pot flows through the siphon lead release pipe and the lead release valve of the lead smelting pot into the lead package for subsequent use. The flue gas formed during production is introduced into the dust remover through the flue gas duct for dust removal and purification, and fail gas meeting the discharging criteria is blown by an air blower to a chimney and discharged.

1. The high-temperature flue gas from the lead smelting pot is fully utilized to dry the lead grid to ensure that the moisture content of the material fed into the pot is lower than 3%, thereby effectively solving the problem that the introduction of a lead grid with high moisture content into the lead smelting pot causes explosion, ensuring the safety of production, improving the operational safety performance, realizing the comprehensive utilization of waste heat, and achieving an excellent energy conservation effect.

2. The low smelting temperature effectively retains valuable metals such as antimony and tin in the lead grid, reducing the production costs of alloy preparation and conserving resources.

3. Continuous material feeding, automatic ash acquiring, and continuous lead release are realized with high degree of automation.

4. The copper-made terminal is effectively separated from the lead ash, and the efficient recycling of copper-made terminals on waste lead acid storage batteries is realized, thereby conserving copper resources and improving the purity of secondary lead. As water is used as the sorting medium during production and recycled, there is no flying dust and zero emission is realized.

5. The entire apparatus operates under negative pressure, and the flue gas is drawn by the air blower into the dust remover and purified to meet the discharging criteria, thereby protecting the environment.

Advantages: This apparatus features a simple structure, a stable and continuous production process, high degree of automation, high heat utilization, and energy conservation.

Figure 1:
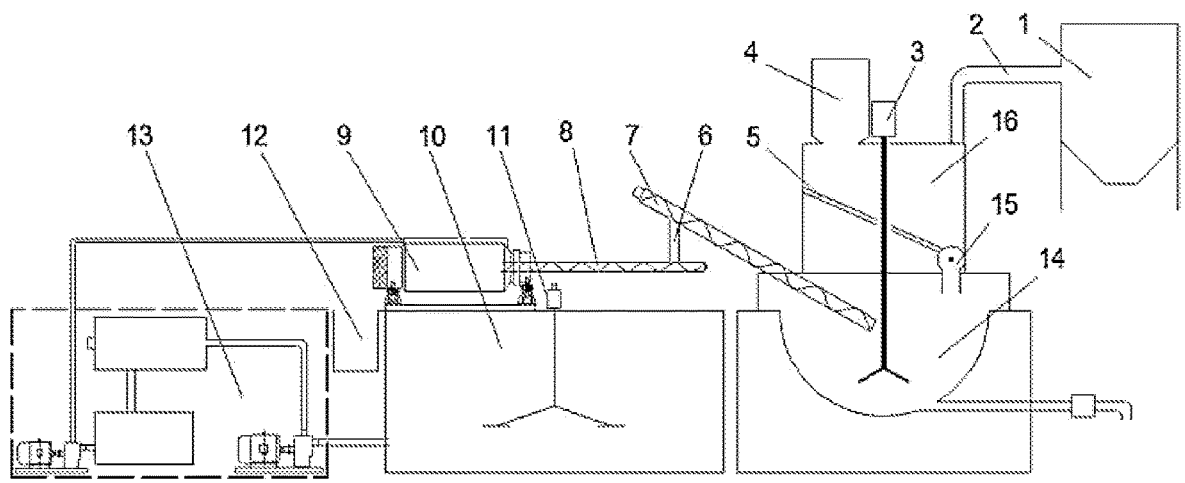
FIG. 1 is a structural diagram of the present invention.
Figure 2:
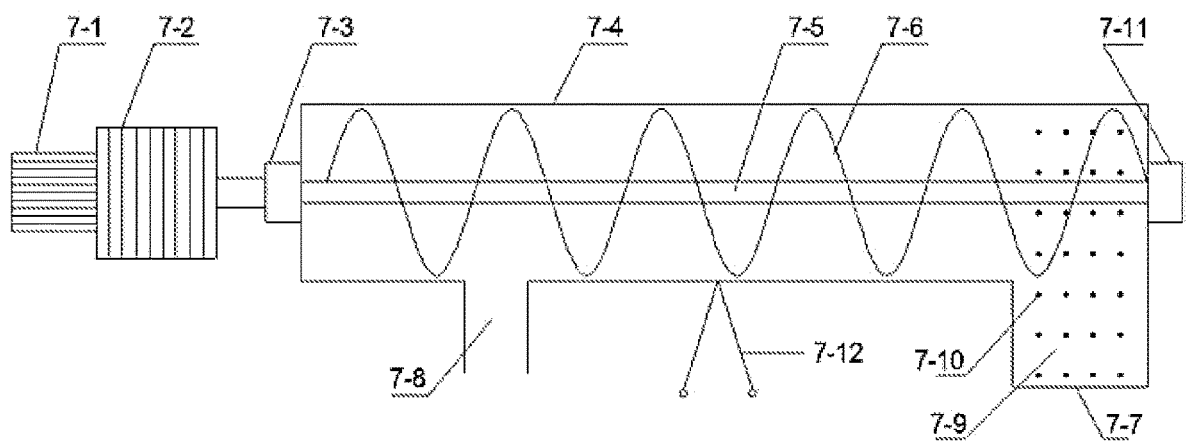
FIG. 2 is a structural diagram of an automatic ash acquiring machine of the present invention.
Figure 3:
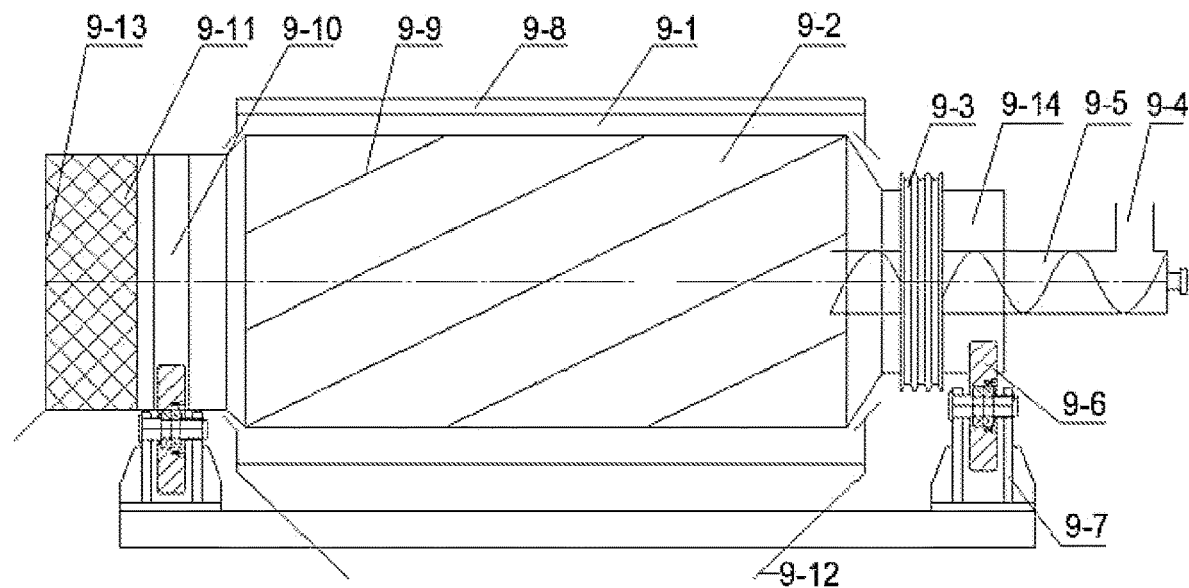
FIG. 3 is a structural diagram of a copper-made terminal separator of the present invention.
Figure 4:
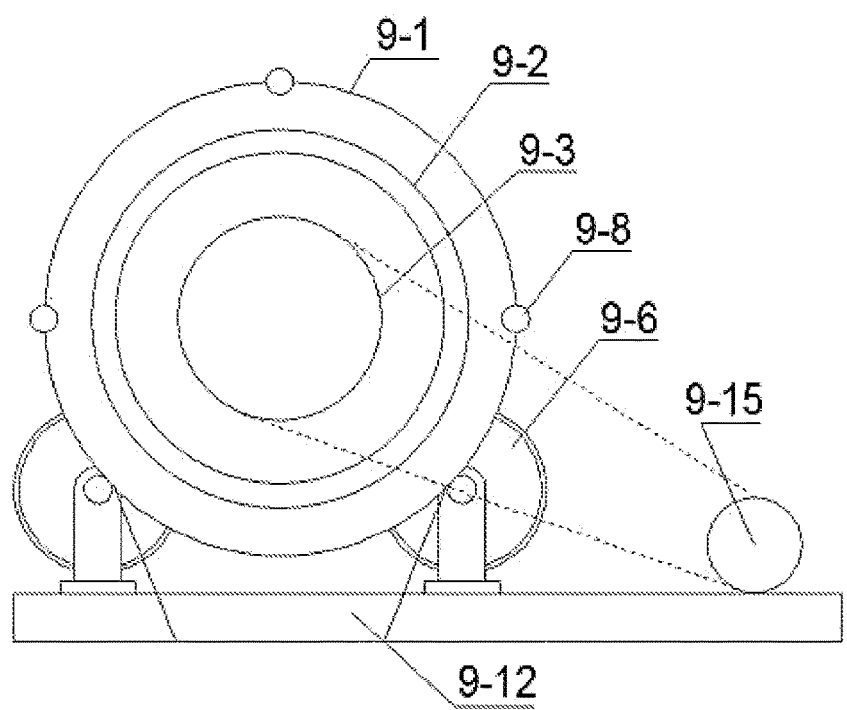
FIG. 4 is a structural side view of FIG. 3.
Figure 5:
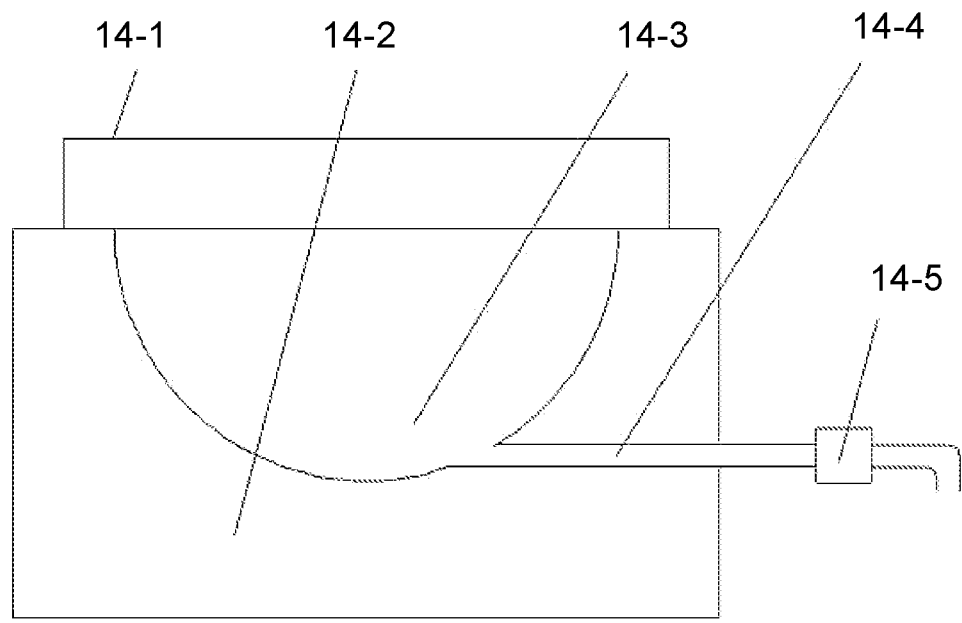
FIG. 5 is a structural diagram of a smelting apparatus of the present invention.
Figure 6:
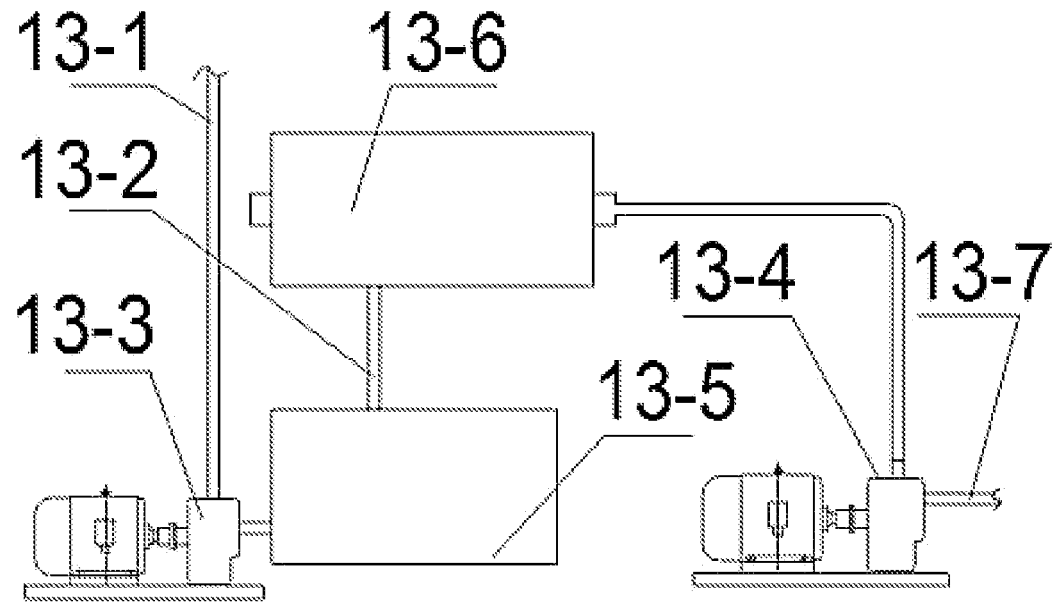
FIG. 6 is a structural diagram of a circulating water treatment apparatus of the present invention.
Figure 7:
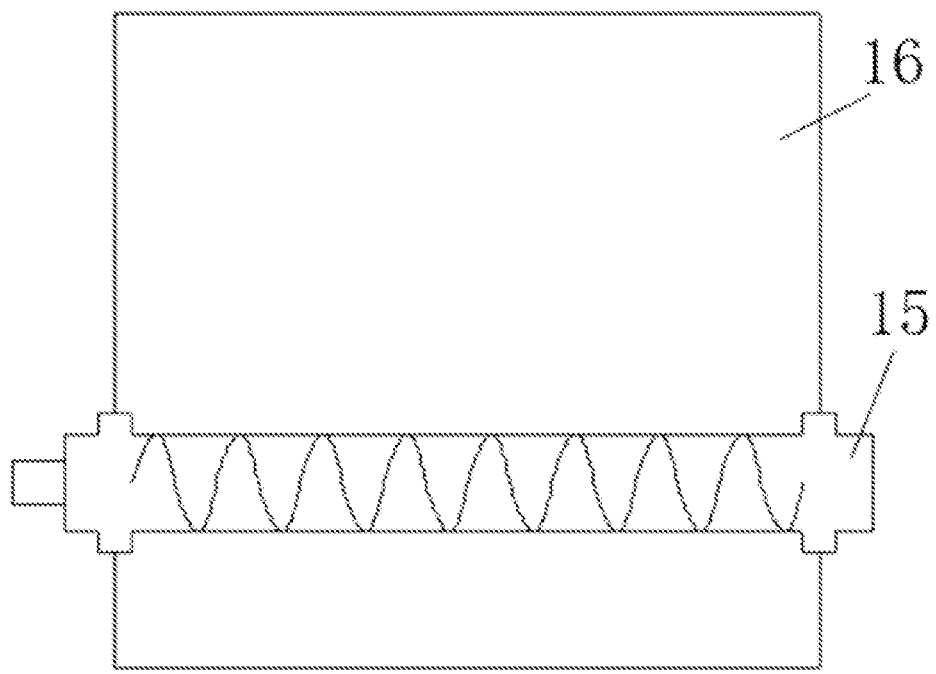
FIG. 7 is a structural diagram of a spiral feeder of the present invention.
Figure 8:
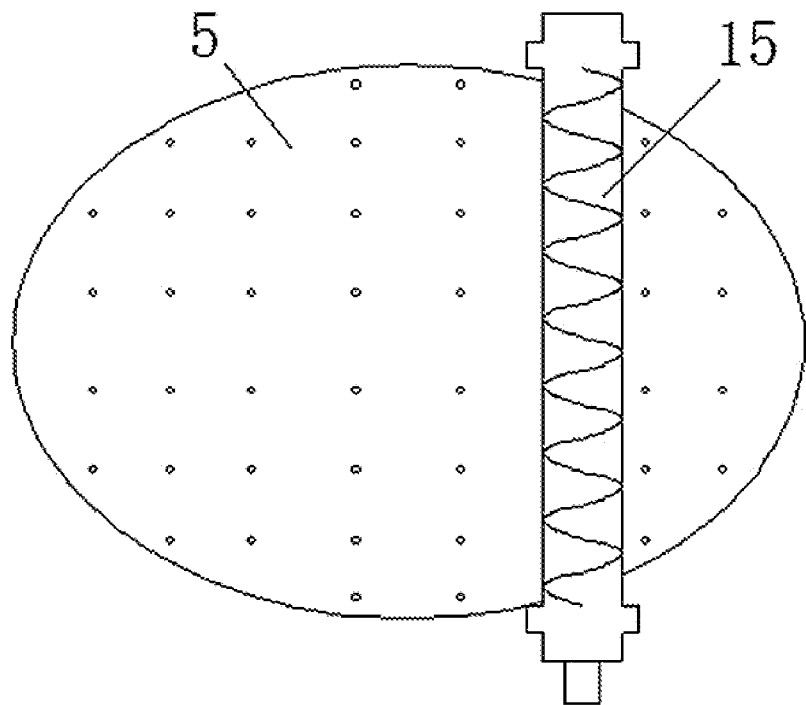
FIG. 8 is a structural diagram of a lead grid barrier plate of the present invention.

In the drawings: 1. dust remover; 2. flue gas duct; 3. lead-containing liquid agitator; 4. lead grid turnover box; 5. lead grid barrier plate; 6. ash discharging tube; 7. automatic ash acquiring machine; 8. lead ash transporter; 9. copper-made terminal separator; 10. lead mud tank; 11. lead mud agitator; 12. copper piece collection box; 13. circulating water treatment apparatus; 14. smelting apparatus; 15. spiral feeder; 16. drying drum; 7-1. motor; 7-2. reducer; 7-3. coupling; 7-4. cylinder; 7-5. main shaft; 7-6. spiral blade; 7-7. ash inlet; 7-8. ash outlet; 7-9. ash collecting plate; 7-10. leakage hole; 7-11. bottom bearing seat; 7-12. bracket traveling wheel; 9-1. outer cylinder; 9-2. rotary screen; 9-3. drive pulley; 9-4. ash inlet; 9-5. lead ash transporter; 9-6. supporting roller; 9-7. supporting roller bracket; 9-8. circulating water flushing pipe; 9-9. material deflector; 9-10. discharge port supporting roller track; 9-11. copper piece screen; 9-12. lead ash slurry outlet; 9-13. copper piece discharging port; 9-14. feeding port supporting roller track; 9-15. motor; 14-1. pot cover; 14-2. smelting furnace; 14-3. smelting pot; 14-4. siphon lead release pipe; 14-5. lead release valve; 13-1. clean water output pipe; 13-2. filter pressing water return pipe; 13-3. clean water pump; 13-4. lead mud pump; 13-5. circulating water pool; 13-6. filter press; 13-7. lead slurry input pipe.

DETAILED DESCRIPTION OF THE EMBODIMENTS

The technical solutions of the present invention will be further described below with reference to the accompanying drawings.

Embodiment 1: The separating and melting system and method for a waste lead grid includes a dust remover 1, a flue gas duct 2, a lead-containing liquid agitator 3, a lead grid turnover box 4, a lead grid barrier plate 5, an ash discharging tube 6, an automatic ash acquiring machine 7, a lead ash transporter 8, a copper-made terminal separator 9, a lead mud tank 10, a lead mud agitator 11, a copper piece collection box 12, a circulating water treatment apparatus 13, a smelting apparatus 14, a spiral feeder 15, and a drying drum 16.

The drying drum 16 is mounted on an upper end of the smelting apparatus 14. The dust remover 1 is connected to an upper end of the drying drum 16 by means of the flue gas duct 2. The lead grid turnover box 4 is connected to the upper end of the drying drum 16. The lead-containing liquid agitator 3 extends through the drying drum 16 into the smelting apparatus 14. The spiral feeder 15 is mounted on the smelting apparatus 14 and located in the drying drum 16. One end of the lead grid barrier plate 5 is placed on the spiral feeder 15, and the other end of the lead grid barrier plate 5 is placed on an inner wall of the drying drum 16. The automatic ash acquiring machine 7 is mounted on the smelting apparatus 14, a feed end of the automatic ash acquiring machine 7 is located in the smelting apparatus 14, and a discharge port of the automatic ash acquiring machine 7 is connected to a feed inlet of the lead ash transporter 8 by means of the ash discharging tube 6. A discharge port of the lead ash transporter 8 is located at the copper-made terminal separator 9. The copper-made terminal separator 9 is mounted on the lead mud tank 10. A circulating water flushing pipe 9-8 on the copper-made terminal separator 9 is connected to a clean water outlet end of the circulating water treatment apparatus 13 by means of a conduit, and a waste water inlet end of the circulating water treatment apparatus 13 is connected to a lower portion of the lead mud tank 10. The lead mud agitator 11 is further connected to the lead mud tank 10.

The smelting apparatus 14 includes a pot cover 14-1, a smelting furnace 14-2, a smelting pot 14-3, a siphon lead release pipe 14-4, and a lead release valve 14-5. The smelting pot 14-3 is placed on the smelting furnace 14-2. The pot cover 14-1 is provided on a top of the smelting pot 14-3. The siphon lead release pipe 14-4 is provided at a bottom of the smelting pot 14-3. The siphon lead release pipe 14-4 outputs a lead-containing liquid by means of the lead release valve 14-5. The drying drum 16, the spiral feeder 15, and the automatic ash acquiring machine 7 are placed on the pot cover 14-1.

The automatic ash acquiring machine includes a motor 7-1, a reducer 7-2, a coupling 7-3, a cylinder 7-4, a main shaft 7-5, a spiral blade 7-6, an ash inlet 7-7, an ash outlet 7-8, an ash collecting plate 7-9, leakage holes 7-10, a bottom bearing seat 7-11, and a bracket traveling wheel 7-12. A front end of the cylinder 7-4 is provided with the ash outlet 7-8, and a rear end of the cylinder is provided with the ash inlet 7-7. The main shaft 7-5 is mounted in the cylinder 7-4. The spiral blade 7-6 is mounted on the main shaft 7-5. The main shaft 7-5 runs through the cylinder 7-4. A rear end of the main shaft is connected to the bottom bearing seat 7-11, and a front end of the main shaft 7-5 is connected to the coupling 7-3. The coupling 7-3 is connected to the motor 7-1 by the reducer 7-2. The ash collecting plate 7-9 is connected to the cylinder 7-4 at a position of the ash inlet 7-7.

Leakage holes 7-10 having a diameter of φ3-6 mm are evenly distributed on the ash collecting plate 7-9, allowing the lead-containing liquid to flow back into the smelting lead pot, so that the lead-containing liquid is fully separated from a lead ash.

The bracket traveling wheel 7-12 is connected to a bottom surface of the cylinder 7-4. The bracket traveling wheel 7-12 is located on a wall of the cylinder 7-4 between the ash outlet 7-8 and the ash inlet 7-7. Wheels are disposed on bracket feet of the bracket traveling wheel 7-12, to facilitate the movement of the entire ash acquiring machine on the ground.

The spiral feeder 15 is located at a lower end of the lead grid barrier plate 5 and has two ends arranged outside the drying drum 16. The spiral feeder is provided with a feeding port at an upper portion thereof and a discharging port at a lower portion thereof.

The lead grid barrier plate 5 is an elliptical 10-20 mm thick high-temperature resistant steel plate, with all sides thereof connected to the inner wall of the drying drum 16. The lower end of the lead grid barrier plate 5 is connected to the spiral feeder 7, forming an angle of 30-60° with a surface of the smelting pot. Vent holes having a diameter of φ2-6 mm are evenly distributed on the lead grid barrier plate, to facilitate the transfer of flue gas waste heat to preheat the waste lead grid.

The copper-made terminal separator 9 includes an outer cylinder 9-1, a rotary screen 9-2, a drive pulley 9-3, an ash inlet 9-4, a lead ash transporter 9-5, a supporting roller 9-6, a supporting roller bracket 9-7, the circulating water flushing pipe 9-8, a material deflector 9-9, a discharge port supporting roller track 9-10, a copper piece screen 9-11, a lead ash slurry outlet 9-12, a copper piece discharge port 9-13, a feeding port supporting roller track 9-14, and a motor 9-15. Two ends of the rotary screen 9-2 are each connected to a supporting roller track, i.e., are respectively connected to the discharge port supporting roller track 9-10 and the feeding port supporting roller track 9-14. The supporting roller track is a hollow ring in communication with an inside of the rotary screen. A corresponding supporting roller 9-6 is provided on the supporting roller track. The supporting roller 9-6 is mounted on the supporting roller bracket 9-7. One end of the discharge port supporting roller track 9-10 is connected to the copper piece screen 9-11. An end portion of the copper piece screen 9-11 is a copper piece discharging port 9-13. The drive pulley 9-3 is connected to one side of the feeding port supporting roller track 9-14. The drive pulley 9-3 is connected to the motor 9-15 by a belt. The lead ash transporter 9-5 runs through the ring of the feeding port supporting roller track and enters the rotary screen 9-2. The ash inlet 9-4 is provided at the other end of the lead ash transporter 9-5. The material deflector 9-2 is provided at an inner wall of the rotary screen 9-9. The outer cylinder 9-1 is provided outside the rotary screen 9-2. The lead ash slurry outlet 9-12 is provided at a bottom of the outer cylinder 9-1. The circulating water flushing pipe 9-8 is connected to the outer cylinder 9-1. The circulating water flushing pipe 9-8 sprays circulating water to the rotating rotary screen 9-2.

The circulating water treatment apparatus includes a clean water output pipe 13-1, a filter pressing water return pipe 13-2, a clean water pump 13-3, a lead mud pump 13-4, a circulating water pool 13-5, a filter press 13-6, and a lead slurry input pipe 13-7. A water inlet end of the clean water pump 13-3 is connected to the circulating water pool 13-5. A water outlet end of the clean water pump 13-3 is connected to a circulating water inlet pipe 13-1. The filter press 13-6 is provided above the circulating water pool 13-5. An output end of the filter press 13-6 is connected to the circulating water pool 13-5 by the filter pressing water return pipe 13-2. An input end of the filter press 13-6 is connected to an output end of the lead mud pump 13-4 by a conduit, and an input end of the lead mud pump 13-4 is connected to the lower portion of the lead mud tank 10.

The separating and melting method includes the following steps:

Step (1) crushing and sorting a waste lead acid storage battery, and placing the sorted lead grid into the turnover box for later use;

Step (2) drying and preheating the waste lead grid by using a high-temperature flue gas of a smelting pot, controlling a moisture content of the waste lead grid to be 2% or below, and placing the waste lead grid into the smelting pot for low-temperature melting;

Step (3) using the automatic ash acquiring machine for ash acquiring to separate the melted lead-containing liquid from a floating slag, and transporting the lead floating slag to the copper-made terminal separator;

Step (4) turning on the separator, spraying high-pressure circulating water to the lead floating slag containing a copper-made terminal to wash away oxidized lead ash attached to the copper-made terminal, further moving the copper-made terminal forward under the action of the material deflector, and discharging the copper-made terminal from the copper piece discharging port of the copper piece screen to complete separation of the copper-made terminal from the lead ash; and Step (5) causing the purified lead-containing liquid to flow into a heat preservation lead package through a lead release pipe and a lead release valve, for preparing an alloy in a next process.

What is claimed is:

1. A separating and melting system for a waste lead grid in a waste lead acid storage battery recycling, characterized in that the separating and melting system for the waste lead grid comprises a dust remover, a flue gas duct, a first agitator for lead-containing liquid, a turnover box for lead grid, a barrier plate for lead grid, an ash discharging tube, an automatic ash acquiring machine, a transporter for lead ash, a separator for copper-made terminals, a tank for lead mud, a second agitator for lead mud, a copper piece collection box, a circulating water treatment apparatus, a smelting apparatus, a spiral feeder, and a drying drum, wherein the drying drum is mounted over and on an upper end of the smelting apparatus, the dust remover is connected to an upper end of the drying drum by means of the flue gas duct, the turnover box is connected to the upper end of the drying drum, and the first agitator extends down through the drying drum into the smelting apparatus;

the spiral feeder is mounted on the smelting apparatus and located in the drying drum, one end of the barrier plate is placed on the spiral feeder, and the other end of the barrier plate is placed on an inner wall of the drying drum;

the automatic ash acquiring machine is mounted on the smelting apparatus, a feed end of the automatic ash acquiring machine is located in the smelting apparatus, and a discharge port of the automatic ash acquiring machine is connected to a feed inlet of the transporter by means of the ash discharging tube; and a discharge port of the transporter is located at the separator, and the separator is mounted on the tank; and a circulating water flushing pipe on the separator is connected to a clean water outlet end of the circulating water treatment apparatus by means of a conduit, and a waste water inlet end of the circulating water treatment apparatus is connected to a lower portion of the tank, and the second agitator is further connected to the tank.

2. The separating and melting system for the waste lead grid in waste lead acid storage battery recycling according to claim 1, characterized in that the smelting apparatus comprises a pot cover, a smelting furnace, a smelting pot, a siphon lead release pipe, and a lead release valve, wherein the smelting pot is placed on the smelting furnace, the pot cover is provided on a top of the smelting pot, the siphon lead release pipe is provided at a bottom of the smelting pot, and the siphon lead release pipe outputs a lead-containing liquid by means of the lead release valve; and the drying drum, the spiral feeder, and the automatic ash acquiring machine are placed on the pot cover.

3. The separating and melting system for the waste lead grid in waste lead acid storage battery recycling according to claim 1, characterized in that the automatic ash acquiring machine comprises a motor, a reducer, a coupling, a cylinder, a main shaft, a spiral blade, an ash inlet, an ash outlet, an ash collecting plate, leakage holes, a bottom bearing seat and a bracket traveling wheel, wherein a front end of the cylinder is provided with the ash outlet, a rear end of the cylinder is provided with the ash inlet, the main shaft is mounted in the cylinder, the spiral blade is mounted on the main shaft, the main shaft runs through the cylinder, a rear end of the main shaft is connected to the bottom bearing seat, a front end of the main shaft is connected to the coupling, and the coupling is connected to the motor by the reducer;

the ash collecting plate is connected to the cylinder at a position of the ash inlet; the leakage holes having a diameter of $\phi$3-6 mm are evenly distributed on the ash collecting plate, allowing the lead-containing liquid to flow back into a lead smelting pot, so that the lead-containing liquid is fully separated from a lead ash; and the bracket traveling wheel is connected to a bottom surface of the cylinder, the bracket traveling wheel is located on a wall of the cylinder between the ash outlet and the ash inlet, and wheels are disposed on bracket feet of the bracket traveling wheel, to facilitate a movement of the entire ash acquiring machine on ground.

4. The separating and melting system for the waste lead grid in waste lead acid storage battery recycling according to claim 1, characterized in that the spiral feeder is located at a lower end of the barrier plate and has two ends arranged outside the drying drum, and the spiral feeder is provided with a feeding port at an upper portion thereof and a discharging port of the spiral feeder at a lower portion thereof.

5. The separating and melting system for the waste lead grid in waste lead acid storage battery recycling according to claim 1, characterized in that the barrier plate is an elliptical 10-20 mm thick steel plate, with all sides thereof connected to the inner wall of the drying drum, a lower end of the barrier plate is connected to the spiral feeder, forming an angle of 30-60° with a surface of a smelting pot, and vent holes having a diameter of $\phi$2-6 mm are evenly distributed on the barrier plate, to facilitate transfer of flue gas waste heat to preheat the waste lead grid.

6. The separating and melting system for the waste lead grid in waste lead acid storage battery recycling according to claim 1, characterized in that the separator comprises an outer cylinder, a rotary screen, a drive pulley, an ash inlet, the transporter, a supporting roller, a supporting roller bracket, the circulating water flushing pipe, a material deflector, a discharge port supporting roller track, a copper piece screen, a lead ash slurry outlet, a copper piece discharge port, a feeding port supporting roller track, and a motor, wherein two ends of the rotary screen are each connected to a supporting roller track, and are respectively connected to the discharge port supporting roller track and the feeding port supporting roller track, the supporting roller track is a hollow ring in communication with an inside of the rotary screen, a corresponding supporting roller is provided on the supporting roller track, and the supporting roller is mounted on the supporting roller bracket;

one end of the discharge port supporting roller track is connected to the copper piece screen, and an end portion of the copper piece screen is a copper piece discharge port; the drive pulley is connected to one side of the feeding port supporting roller track, and the drive pulley is connected to the motor by a belt;

the lead ash transporter runs through the ring of the feeding port supporting roller track and enters the rotary screen, and the ash inlet is provided at the other end of the lead ash transporter;

the material deflector is provided at an inner wall of the rotary screen; and the outer cylinder is provided outside the rotary screen, the lead ash slurry outlet is provided at a bottom of the outer cylinder, the circulating water flushing pipe is connected to the outer cylinder, and the circulating water flushing pipe sprays circulating water to the rotary screen.

7. The separating and melting system for the waste lead grid in waste lead acid storage battery recycling according to claim 1, characterized in that the circulating water treatment apparatus comprises a clean water output pipe, a filter pressing water return pipe, a clean water pump, a lead mud pump, a circulating water pool, a filter press, and a lead slurry input pipe, wherein a water inlet end of the clean water pump is connected to the circulating water pool, a water outlet end of the clean water pump is connected to a circulating water inlet pipe, the filter press is provided above the circulating water pool, and an output end of the filter press is connected to the circulating water pool by the filter pressing water return pipe; and an input end of the filter press is connected to an output end of the lead mud pump by the conduit, and an input end of the lead mud pump is connected to the lower portion of the tank.

\* \* \* \* \*